(12) United States Patent
Shimizu et al.

(10) Patent No.: US 6,639,810 B2
(45) Date of Patent: Oct. 28, 2003

(54) INVERTER APPARATUS FOR CONTROLLING A GENERATOR OUTPUT TO SIGN-WAVE VOLTAGE

(75) Inventors: Motohiro Shimizu, Saitama (JP); Masashi Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/206,362

(22) Filed: Jul. 29, 2002

(65) Prior Publication Data

US 2003/0043604 A1 Mar. 6, 2003

(30) Foreign Application Priority Data

Sep. 4, 2001 (JP) ........................................ 2001-267625

(51) Int. Cl.[7] ............................................. H02M 3/335
(52) U.S. Cl. ........................................... 363/16; 363/97
(58) Field of Search ............................. 363/16, 97, 131

(56) References Cited

U.S. PATENT DOCUMENTS 5,625,539 A * 4/1997 Nakata et al. ................ 363/17
6,046,624 A * 4/2000 Nam et al. ................... 327/530
6,369,553 B1 * 4/2002 Davis ........................... 323/274
6,496,397 B2 * 12/2002 Sakai et al. .................. 363/131

FOREIGN PATENT DOCUMENTS

JP          04-355672          12/1992

* cited by examiner

*Primary Examiner*—Bao Q. Vu
(74) *Attorney, Agent, or Firm*—Armstrong, Westerman & Hattori, LLP.

(57) ABSTRACT

An inverter 3 is controlled by feeding back an output voltage waveform for stabilizing the output and circuitry simplification. The output waveform of an inverter 3 is supplied to a CPU 5 to generate a correction of the reference sine waveform signal RS which is then used for producing a desired form of PWM signal. The output waveform is A/D converted by a converter 18 which comprises two modules 19 and 20 before transferred to a processor 50. The output waveform is received by two channels of each of the modules 19 and 20. As the input channels are sampled in a sequence, their waveforms are A/D converted at intervals of a time in each sampling period and can thus be improved in the resolution of A/D conversion. Since the modules 19 and 20 are operated at different timings lagged slightly from each other, the resolution can be increased.

2 Claims, 4 Drawing Sheets

INVERTER 3
OUTPUT VOLTAGE

INVERTER APPARATUS FOR CONTROLLING A GENERATOR OUTPUT TO SIGN-WAVE VOLTAGE

BACKGROUND OF THE INVENTION

1. Field of the Invention

The present invention relates to an inverter apparatus and particularly to an inverter apparatus appropriated for correcting waveform distortions of the output voltage of an inverter controlled generator or the like.

2. Description of the Related Art

An inverter apparatus has commonly been employed in a portable or mobile power source, such as an engine-driven alternating current generator, for stabilizing the output voltage. It is known in a power source such as an engine generator that the output voltage is stabilized through feedback controlling. However, such feed-back controlling of the output voltage is imperfect to produce a desired shape of its sine waveform. Preferable is feed-back of the waveform output. An inverter apparatus developed by, the applicants of this invention, is disclosed in Japanese Patent 2688660. The inverter apparatus is operated by pulse width modulation (PWM) technique and has a pulse width modulator circuit arranged to receive a switching output voltage waveform fed back from the inverter and release its resultant PWM signal.

The inverter apparatus disclosed in the above publication also has an output waveform feedback controlling means provided in the form of-an analog circuit. The analog circuit is however unfavorable because its components are increased in the number and have uneven performance thus changing the output voltage. Such uneven performance have to be significantly reduced. For the purpose, the analog circuit becomes intricate in the arrangement.

The analog circuit may be replaced with a microcomputer (CPU) which has a greater degree of data processability and can carry out a feedback control action at every PWM period. The CPU receives voltage waveforms or current waveforms of digital form which have been A/D converted from analog forms. It is however common that the resolution of every A/D converter is lower than the number of bits to be processed by the CPU. For example, the resolution of applicable A/D converters is as low as 10 bits while a standard CPU can handle 16 or 32 bits at once.

SUMMARY OF THE INVENTION

It is hence an object of the present invention to provide an inverter apparatus capable of feedback controlling with the best use of its CPU capability through improving the substantial resolution of an A/D converter.

This invention has the first feature, where an inverter apparatus having a direct current source circuit for converting an alternating current output of a generator into a direct current, a switching device for switching to control the direct current, a modulating means for pulse width modulating a reference sine wave signal at a predetermined frequency to produce a PWM signal, and a switching control circuit responsive to the PWM signal for driving the switching device to provide the alternating current through a pair of output lines, said inverter apparatus comprising a correction signal generating means for generating a correction of the reference sine wave signal in view of the alternating current waveform to correct the alternating current waveform on the output lines to a desired shape of the sine waveform; and an A/D converter having a plurality of input channels, wherein the alternating current waveform is received by at least two of the input channels of the A/D converter, and two channels of the alternating current waveform converted to their digital form by the A/D converter are summed and then transferred to the correction signal generating means.

According to the first feature, the alternating current waveform is received by a plurality of the input channels of the A/D converter. More specifically, the different signals are A/D converted at intervals of a time in a single input sampling action and are supplied to the correction signal generating means. As a result, the number of sampled data is increased and the A/D conversion can thus be improved in the resolution.

This invention has the second feature where said inverter apparatus also having a plurality of the A/D converters which can operate separately from each other, the A/D converters are operated at different timings lagged from each other for sampling the input channels, and the correction signal generating means receives a sum of the alternating current waveform converted into their digital form by the corresponding A/D converters.

According to the second feature, the sampling action of one of the A/D converters is commenced with time lag from sampling start of the other A/D converter, where the lag is shorter than the sampling period of one channel of the other A/D converter. As a result, a change in the signal during the minimum of the sampling period of the A/D converters can be identified with the use of a time lag of the sampling between the A/D converters.

DETAILED DESCRIPTION OF THE PREFERRED EMBODIMENTS

Figure 2:
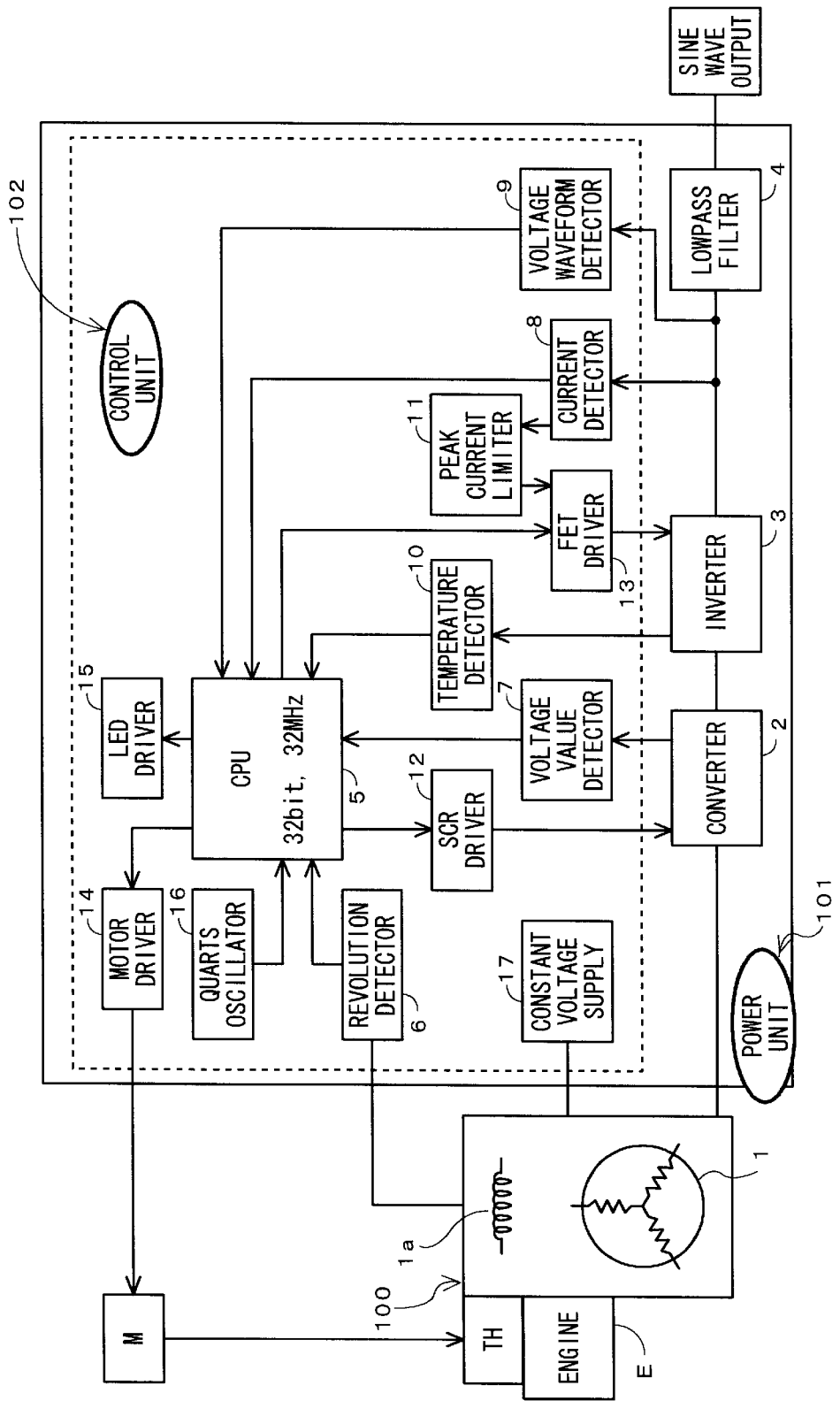
FIG. 2 is a block diagram showing a system arrangement in the inverter apparatus according to the embodiment of the present invention.

One embodiment of the present invention will be described in more detail referring to the relevant drawings. FIG. 2 is a block diagram showing an arrangement of an inverter apparatus of the embodiment of the present invention. A generator 100 includes a rotor driven by an engine E and a stator (rotor and stator are not shown). The stator has a three-phase output winding 1 and a single-phase auxiliary winding 1a wound thereon. The engine E is equipped with a throttle valve TH and a stepping motor M for driving the throttle valve TH.

The rotor in the generator 100 has multi-pole permanent magnets and when driven by the engine E, causes the three-phase output winding 1 to generate an alternating current at a frequency determined by the number of revolutions of the engine E. The alternating current output of the three-phase output winding 1 is then transferred to a direct current source circuit or converter 2 where it is converted into a direct current form. The direct current output of the converter 2 is transferred to a switching device or inverter 3 where it is converted into an alternating current at a predetermined frequency by the action of an FET bridge circuit.

The alternating current from the inverter 3 is received by a lowpass filter 4 (L-C lowpass) where its low frequency component (a commercial frequency range in this embodiment) is filtered out for providing an alternating current output with a commercial frequency.

The engine E, the converter 2, the inverter 3, and the lowpass filter 4 constitute a power unit 101 which is controlled by a control unit 102. The control unit 102 includes a 32-bit central processing unit (CPU) 5 which carries out overall processing actions at 32 MHz. The CPU is timed with a reference clock signal of output pulses from a quarts oscillator 16. A constant voltage supply 17 serves as a power source of the control unit 102 for converting the output of the auxiliary winding 1a into a constant voltage.

Data required for operations in the CPU 5 are supplied from the following detectors. A revolution detector 6 is provided for measuring the number of revolutions of the engine E from the alternating current output of the auxiliary winding 1a. Provided as means for detecting the state of the power unit 101 are a voltage detector 7 for measuring the direct current output of the converter 2, a current detector 8 for measuring the output current of the inverter 3, a voltage waveform detector 9 for measuring the waveform of the voltage output of the inverter 3, and a temperature detector 10 for measuring the temperature of the inverter 3. In addition, a peak current limiter 11 for protecting the inverter 3 from over-current.

The converter 2 incorporates a rectifier circuit which has thyristors (SCR) connected in a bridge pattern. Accordingly, the control unit 102 includes an SCR driver 12 for controlling gate signals of the thyristors, an FET driver 13 acting as a switching circuit for controlling the FET of each arm of the bridge circuit in the inverter 3, a motor driver 14 for controlling the stepping motor M to determine the opening of the throttle TH, and an LED driver 15 for driving LEDs for data display. In response to the detected data supplied with the detectors 6, 7, 8, 9, and 10, the CPU 5 generates command signals to the drivers 12, 13, 14, and 15.

The SCR driver 12 is supplied with a command for controlling the conduction angle on the thyristors to maintain the direct current voltage output of the voltage detector 7 at a predetermined level. In response to the command, the SCR driver 12 determines the conduction angle on the thyristors in the converter 2. As the load increases, the direct current output of the converter 2 is declined. Even when the load increases, the direct current voltage can be maintained at the predetermined level by increasing the conduction angle on the thyristors. The conduction angle on the thyristors relates to a surplus of the output of the generator 100 against the load. When the conduction angle is controlled to a desired degree by the number of engine revolutions, the generator 100 can produce an output with generous surplus. In other words, the number of revolutions of the engine E is determined so as to maintain the conduction angle at a desired degree.

The CPU 5 provides the motor driver 14 with a command for adjusting the number of revolutions detected by the revolution detector 6 to a desired level. In response to the command from the CPU 5, the motor driver 14 drives the stepping motor M to determine the throttle opening. This action increases the number of revolutions of the engine E when the load increases so that the conduction angle on the thyristors in the converter 2 remains at a desired degree.

The CPU 5 includes a sine wave generating means for generating a reference sine wave signal at a given frequency (e.g. a commercial frequency) and a pulse width modulating means for pulse width modulating the reference sine wave signal to produce a PWM signal. Also, the CPU 5 has a correction signal calculating means arranged responsive to the wave signal received from the voltage waveform detector 9 for calculating a corrected form of the reference sine wave signal whereby the output of the lowpass filter 4 can exhibit a desired sine waveform containing neither distortion nor offset component.

The FET driver 13 includes a switching control circuit arranged responsive to the PWM signal for switching the FETs in the inverter 3. In response to the PWM signal received from the CPU 5, the FET driver 13 switches the FETs.

The CPU 5 also has a breaker function for stopping the output when the current measurement detected by the current detector 8 exceeds a predetermined level for a predetermined period of time. When the temperature measured by the temperature detector 10 is higher than a reference level determined for protection of the FETs in the inverter 3, the CPU 5 stops generator 100 to provide the power output.

Figure 4:
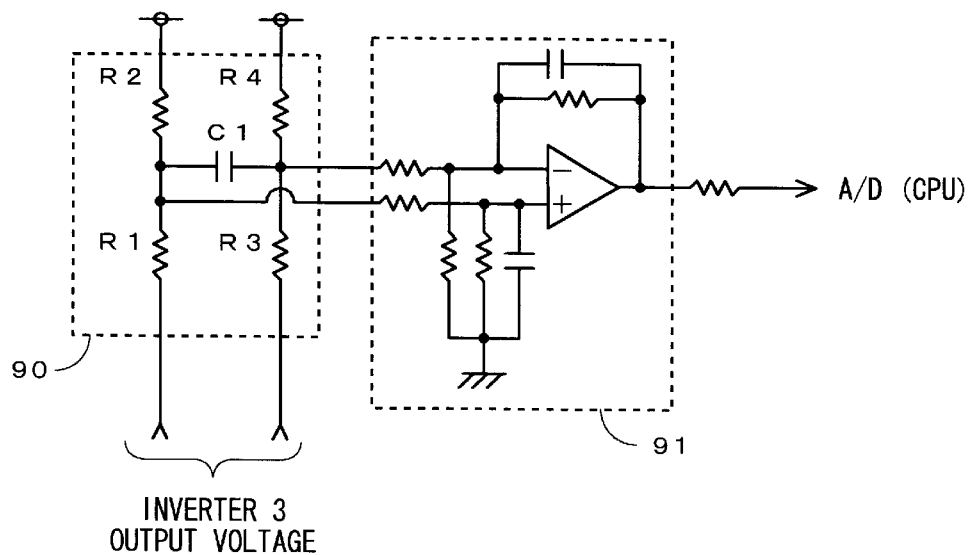
FIG. 4 is a circuitry diagram showing a voltage waveform detector.

FIG. 4 is a circuitry diagram showing an arrangement of the voltage waveform detector 9. The voltage waveform detector 9 comprises a detector circuit 90 including two pairs of voltage-divider resistors R1, R2 and R3, R4 and a capacitor C1 and a differential amplifier 91. The output voltage from the inverter 3 is received by the detector circuit 90 where its carrier frequency component is removed and its resultant waveform of alternating current becomes similar to the output waveform of the lowpass filter 4. The alternating current output is amplified by the differential amplifier 91 and then transferred to the CPU 5 where it is compared with the reference sine wave signal to detect the presence of distortion or offset component.

The interface for connection of signals from the voltage waveform detectors to the CPU 5 will now be explained. The outputs of the voltage waveform detector 9 and the other detectors are analog signals and have to be subjected to the analog to digital (A/D) conversion before transferred to the CPU 5 for data processing. In this embodiment, single analog signal is A/D converted by a plural A/D converters for increasing the substantial resolution. As an analog signal is A/D converted by the plural A/D converters, its data between bits can be dispersed by means of the provability theory thus allowing the resolution of the A/D conversion to be substantially increased.

Figure 1:
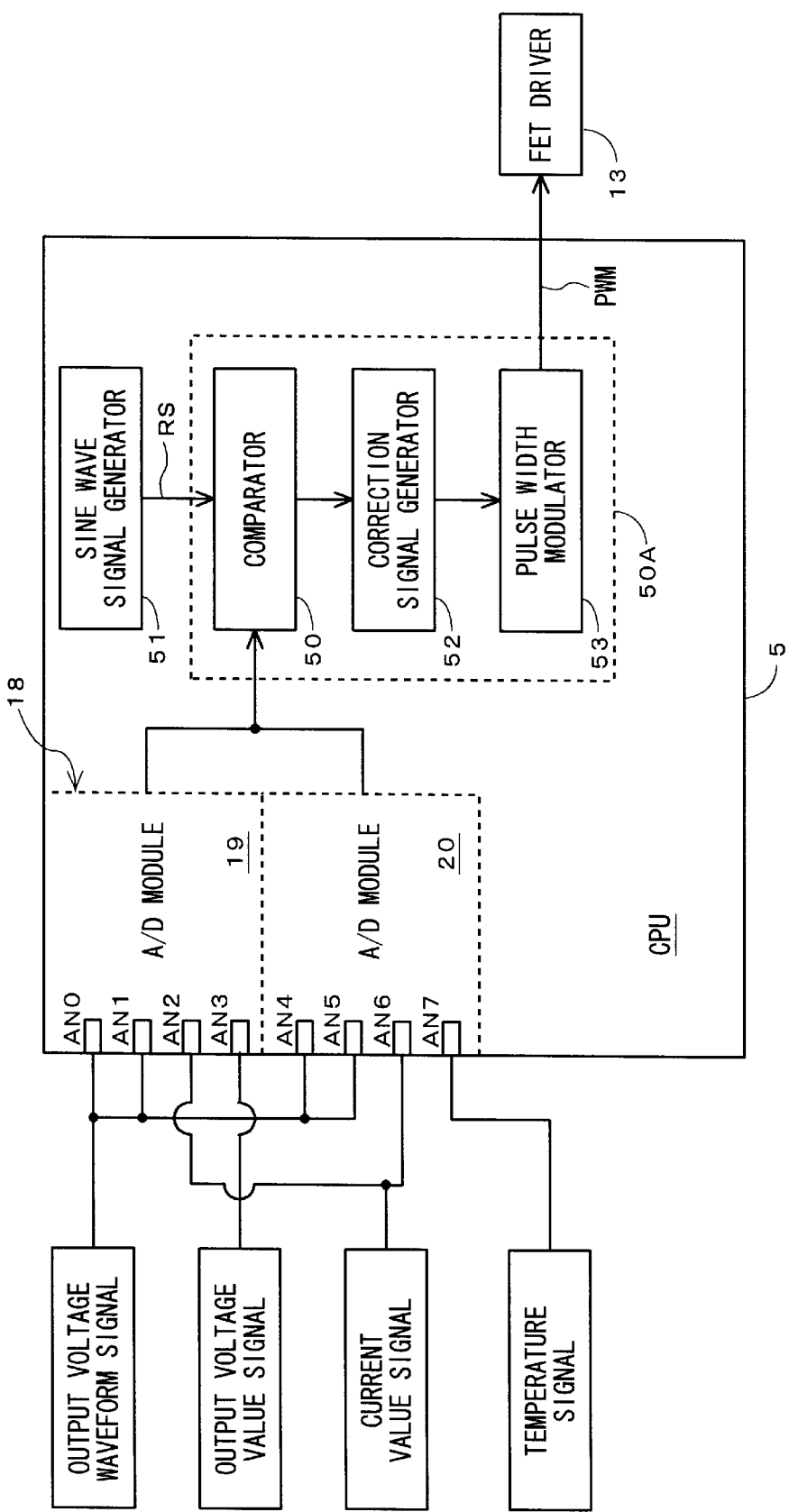
FIG. 1 is a block diagram showing a primary part of a controller in an inverter apparatus according to an embodiment of the present invention.

FIG. 1 illustrates a primary part of the control unit 102. The CPU 5 include an A/D converter array 18 of a 10-bit resolution, sequential comparison type which comprises two A/D modules 19 and 20. While each of the A/D modules has fours channels, a total of eight channels are available. The output voltage waveform from the inverter 3 is received by two channels of each or four channels in a total of the two modules 19 and 20. The current signal is received by one channel of each or two channels in a total of the two modules 19 and 20. The output voltage signal from the converter 2 is received by one of the four channels of the module 19 while the temperature signal from the inverter 3 is received by one of the four channels of the module 20. The two modules 19 and 20 can be operated separately as clocked at different timings for sampling.

The two outputs of the A/D converter array 18 are then summed and received by a corresponding processor in the CPU 5. For example, the voltage waveform sum signal is received by a comparator 50 where it is compared with the reference sine wave signal RS (e.g. at a commercial power frequency) from a sine wave signal generator 51. A result of the comparison is fed back to a correction signal generator 52 for generating a sine wave correction signal. The sine wave correction signal is then transferred to a pulse width modulator 53 where it is processed to generate a PWM signal which is then received by the FET driver 13. The comparator 50, the sine wave signal generator 51, and the correction signal generator 52 constitute the correction signal generating means 50A.

Figure 3:
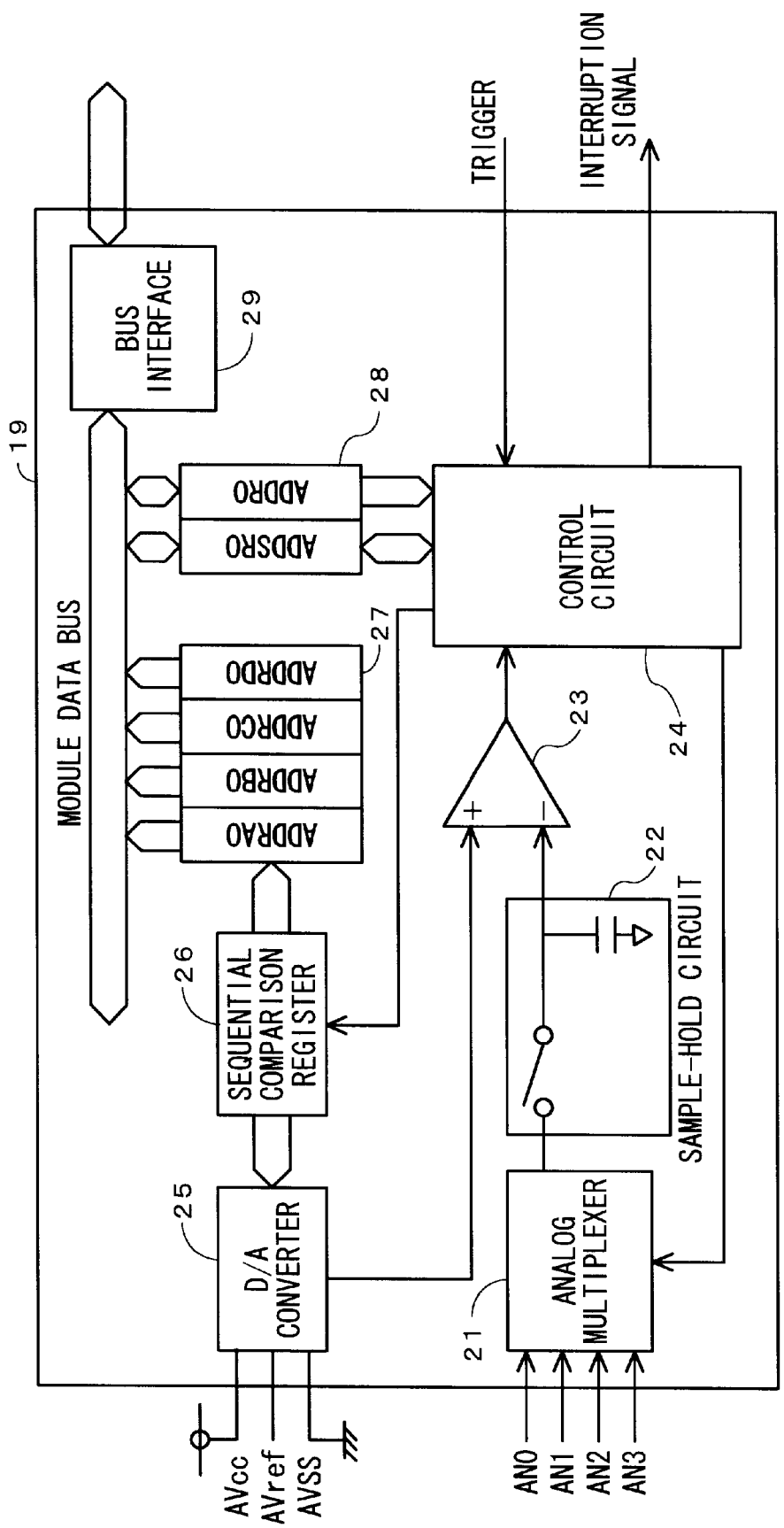
FIG. 3 is a block diagram showing an arrangement of an A/D converter.

FIG. 3 is a block diagram showing an arrangement of the A/D module 19. The A/D module 20 is also identical in the arrangement. As shown in FIG. 3, the A/D module 19 comprises a multiplexer 21, a sample-hold circuit 22, a comparator 23, a control circuit 24, a D/A converter 25, a sequential comparison register 26, a data register 27, a control register 28, and a bus interface 29. The overall action of the A/D module 19 is controlled by the control circuit 24. The control register 28 is set with desired bits determined by a software processing or a timer. The control circuit 24 commands the multiplexer 21 to scan the input channels from AN0 to AN3 for receiving data which are then transferred to the sample-hold circuit 22.

The sequential comparison register 26 allows 10-bit data (comparable data at 1024 levels) to be received in a sequence by the D/A converter 25. The 10-bit D/A converter 25 converts the comparable data into its analog form which is then received by the comparator 23. The comparator 23 compares the sequential comparison data with the data from the sample-hold circuit 22. More specifically, when the sequential comparison data exceeds the data from the sample-hold circuit 22, the current value at the sequential comparison register 26 is transferred to the data register 27. The data received by the data register 27 is outputted via the bus interface 29 to the corresponding processor in the CPU 5.

As the output voltage waveform signal from the inverter 3 is received by the two channels AN0 and AN1, it is sampled in one sequence and A/D converted two times. If the signal is received by one channel, it is sampled in one sequence and A/D converted once. Accordingly, the resolution is doubled or increased to 11 bits. As the two A/D modules 19 and 20 are identical in the arrangement, their A/D conversion actions lagged in the timing from each other can produce a resolution of four times higher or 12-bit quality. For example, the sampling interval of four inputs can be shortened to 12.5 microseconds ($\mu$m) as compared with 50 $\mu$m in the prior art. The current signal input also can be doubled in the resolution.

Since the sampling interval for retrieval of data is shortened, the feedback of the output voltage waveform signal to generate a PWM signal can be minimized in the consumption of time. As a result, the action of the inverter 3 will be controlled at a higher accuracy.

While the A/D converter array 18 is installed in the CPU 5 in the embodiment, it may be provided separately of the CPU 5. The A/D converter array 18 is not limited to a group of A/D modules but may be implemented by a single module.

As apparent from the above description, the invention defined in claims 1 and 2 allows the A/D converter to be practically increased from its lower resolution to a higher level. In particular, the invention defined in claim 2 ensures the identification of a signal which varies in a shorter period than the minimum of the sampling period of the A/D converters.

The invention defined in claims 1 and 2 allows the waveform signal corresponding to the alternating current output of the switching device to be A/D converted at a higher resolution thus ensuring a higher level of the arithmetic operation while being not limited by the resolution of the A/D converter. Since the A/D conversion is carried out at actually a higher level of the resolution, it can respond quickly to a change in the alternating current output of the switching device thus providing a higher level of the sine waveform of the alternating current.

What is claimed is:

1. An inverter apparatus having a direct current source circuit for converting an alternating current output of a generator into a direct current, a switching device for switching to control the direct current, a modulating means for pulse width modulating a reference sine wave signal at a predetermined frequency to produce a PWM signal, and a switching control circuit responsive to the PWM signal for driving the switching device to provide the alternating current through a pair of output lines, said inverter apparatus comprising:

a correction signal generating means for generating a correction of the reference sine wave signal in view of the alternating current waveform to correct the alternating current waveform on the output lines to a desired shape of the sine waveform; and an A/D converter having a plurality of input channels, wherein
the alternating current waveform is received by at least two of the input channels of the A/D converter, and two channels of the alternating current waveform converted to their digital form by the A/D converter are summed and then transferred to the correction signal generating means.

2. An inverter apparatus according to claim 1, wherein a plurality of the A/D converters are provided which can operate separately from each other, the A/D converters are operated at different timings lagged from each other for sampling the input channels, and the correction signal generating means receives a sum of the alternating current waveform converted into their digital form by the corresponding A/D converters.

* * * * *